United States Patent [19]

Miwa et al.

[11] 4,153,916

[45] May 8, 1979

[54] FACSIMILE COMMUNICATION SYSTEM AND METHOD

[75] Inventors: Hirohide Miwa; Kiyoshi Oikawa, both of Kawasaki; Yoshio Iizuka, Sagamihara, all of Japan

[73] Assignee: Fujitsu Limited, Japan

[21] Appl. No.: 849,708

[22] Filed: Nov. 8, 1977

[30] Foreign Application Priority Data

Nov. 12, 1976 [JP] Japan .............................. 51-136008

[51] Int. Cl.² .............................................. H04N 1/32
[52] U.S. Cl. .................................... 358/257; 358/288
[58] Field of Search ................ 358/257, 288, 280, 256

[56] References Cited

U.S. PATENT DOCUMENTS

| 3,646,256 | 2/1972 | Jacob | 358/288 |
| 4,058,672 | 11/1977 | Crager | 358/257 |

Primary Examiner—Howard W. Britton
Attorney, Agent, or Firm—Staas & Halsey

[57] ABSTRACT

A facsimile communication system and method in which facsimile information from original documents is sequentially transmitted from a transmitter to a remote receiver. The transmitter is utilized for changing the data transfer speed of the facsimile information in accordance with an instruction signal provided by the remote receiver. The remote receiver supervises the error rate level of each unit of facsimile information of the original documents and provides the instruction signal when the error rate level is detected to exceed a reference error rate level.

20 Claims, 12 Drawing Figures

FACSIMILE COMMUNICATION SYSTEM AND METHOD

The present invention relates to a facsimile communication system and method for transmitting facsimile information without reducing the quality of the facsimile of the original documents reproduced in a remote receiver. This method may preferably be applied in connection with a facsimile communication system comprising a transmitter, a remote receiver, and a transmission line connected therebetween. Preferably, the transmission line is connected by not using a private line but by using a public transmission circuit network such as conventional telephone lines.

In a facsimile communication system, especially in a facsimile communication system operating under a band compression method, the compressed digital video signal is generally transferred over the transmission line at one of the data transfer speeds selected from 9600 bit/sec, 4800 bit/sec, 2400 bit/sec and 1200 bit/sec. A compressed digital video signal is generally transmitted from the transmitter to the remote receiver by using a quadrature-phase modulation method. However, when the transmission line has a good electric condition, the compressed digital video signal can be transferred thereover at a high data transfer speed such as 9600 bit/sec. Contrary to the above, when the transmission line has an extremely bad electric condition, the compressed digital video signal must be transferred thereover at a low data transfer speed, such as 1200 bit/sec, in order to obtain a high-quality facsimile of the original document, even though the transfer time may take longer than the transfer time of a digital video signal being transferred at a high data transfer speed such as 9600 bit/sec. The data transfer speed is usually determined by carrying out a so-called MODEM (Modulator-Demodulator) training process performed in both the transmitter and the remote receiver. The process of the MODEM training is introduced into the system immediately before supplying the compressed digital video signal, containing the facsimile information to be reproduced by the remote receiver, from the transmitter to the remote receiver. When the transmission line has good electric conditions for transferring facsimile information to the remote receiver, the MODEM training process will automatically determine that transmission may be at a high data transfer speed. On the other hand, a low data transfer rate will be determined by the MODEM training process when the transmission line has a bad electric condition. The selection of the data transfer speed in the transmitter, based on the MODEM training process, is usually performed manually.

As mentioned above, the MODEM training process is introduced immediately before supply of the facsimile information to be reproduced from the transmitter to the remote receiver. Furthermore, it should be noted that the MODEM training process is usually carried out only once per transmission operation for the transfer of facsimile information of one batch of documents. The MODEM training process is carried out by using a pseudo random pattern for testing the electric conditions of the transmission line and for equalizing the MODEM. Accordingly, the method of the prior art for determining the data transfer speed, as described above, is only useful for a facsimile communication system in which the transmission line is connected by a private line, because the electric condition of a private line remains static for many years. Accordingly, the electric condition does not vary during the time from the beginning to the end of the transmission operation for transfer of the facsimile information of at least one batch of documents.

However, in the facsimile communication system in which the transmission line is connected by means of the public transmission circuit network such as conventional telephone lines, the electric condition of the transmission line electrically connected between a transmitter and a remote receiver is not static but dynamic. The reason for this dynamic condition is because, in the public transmission circuit network, the route of a transmission line from a given transmitter to a given remote receiver is often switched from one route to another route by a telegraph supervising office in accordance with the telegraph signal traffic condition of each of the routes of the transmission lines. During transfer of facsimile information over the transmission line, it is not preferable to switch the route of the transmission line. Furthermore, during transfer of facsimile information, if a first transmission line route having a relatively good electric condition is switched to a second transmission line route having a relatively bad electric condition, the first documents in a batch of documents are transferred through the first route, can be reproduced by the remote receiver into a high-quality facsimile. However, the remaining documents of this batch of documents cannot be reproduced into a high-quality facsimile. In the above case, when the first route, over which facsimile information can be transferred at a high data transfer speed, is switched to the second route over which facsimile information is transferred at a low data transfer speed, the data transfer speed should also be simultaneously changed from high to low in order to maintain a high-quality facsimile of the original documents. In the prior art method for determining the data transfer speed, as mentioned above, since the data transfer speed is determined by the MODEM training process, which is carried out immediately before the transfer of facsimile information by use of the above-mentioned pseudo random pattern, the determined data transfer speed is maintained as it is until one transmission operation for the transfer of the facsimile information regarding one batch of documents is finished. Accordingly, the high-quality of the facsimile of the original documents cannot be maintained throughout the scanning of the original documents if the above-mentioned route switch occurs.

Therefore, it is an object of the present invention to provide a facsimile communication system in which the quality of the facsimile of the original documents is always maintained at a high level, even if the transmission line route having a good electric condition is switched to another transmission line route having a bad electric condition, during transmission of the facsimile information of one batch of documents from a transmitter to a remote receiver.

The details of the present invention will become apparent from the ensuing description with reference to the accompanying drawings wherein.

Figure 1:
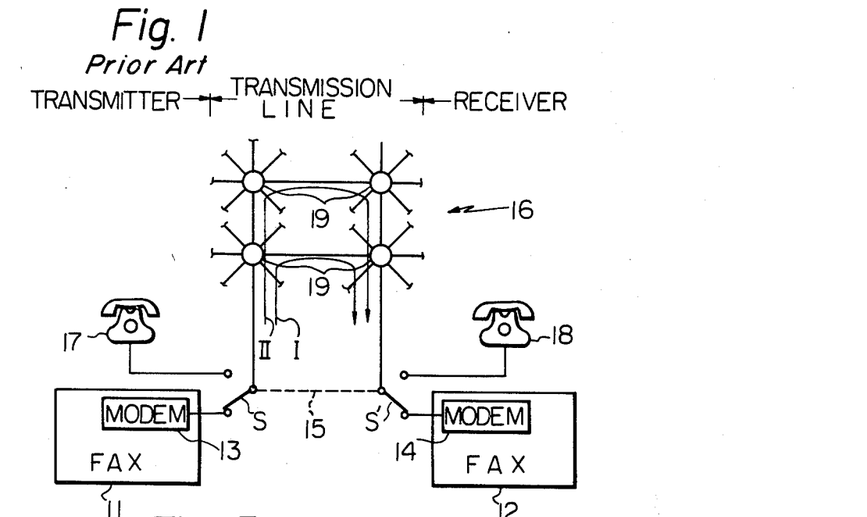
FIG. 1 is a schematic illustration of an entire conventional facsimile communication system.

In FIG. 1 illustrating a conventional facsimile communication system, reference numerals 11 and 12 represent a facsimile unit acting as a transmitter and a facsimile unit acting as a remote receiver, respectively. Each of the two facsimile units can alternately act as a transmitter and a receiver. The transmitter 11 is comprised of a MODEM (Modulator-Demodulator) 13, a conventional scanner (not shown) which scans documents to be reproduced in the remote receiver, a conventional document feeding unit (not shown), electronic control units (not shown), and so on. The remote receiver 12 is comprised of a MODEM 14, a conventional printing unit (not shown) for reproducing facsimile information transmitted from the transmitter 11, electric control units, and so on. The transmitter 11 and the remote receiver 12 are connected by means of a transmission line. The transmission line is connected by a private line indicated by a dotted line 15 or by a public transmission circuit network 16 such as conventional telephone lines. The telephone lines are generally used to connect one telephone unit 17 with another telephone unit 18. The reference numerals 19 schematically indicate conventional switching centers. The telephone unit 17 (18) and the facsimile unit 11 (12) can alternately occupy the transmission line by means of a switching element indicated by reference symbol S or S'.

Figure 2A:
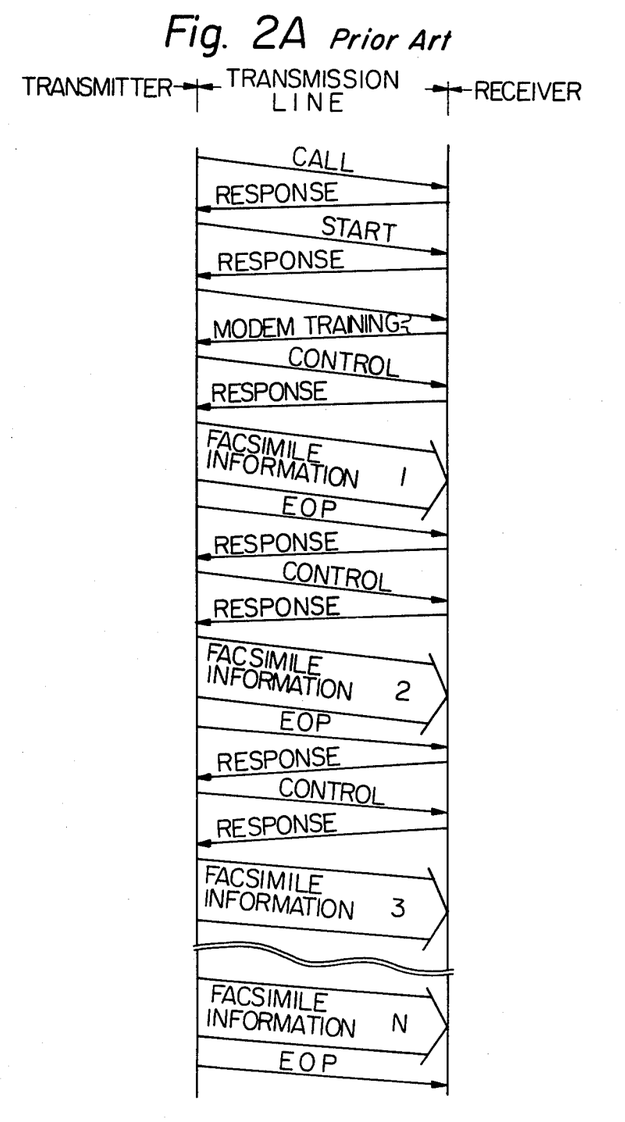
FIG. 2A is a timing chart of the communication processes performed in a facsimile communication system of the prior art.
Figure 2B:
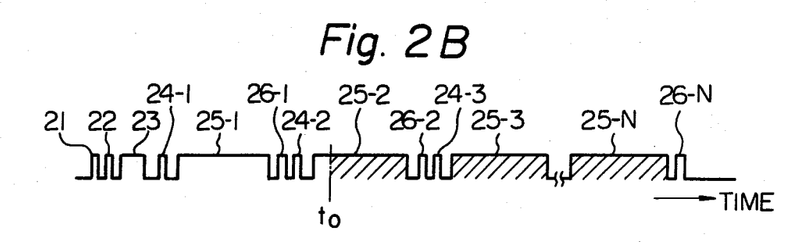
FIG. 2B schematically depicts wave-forms created by a transmitter operating in accordance with the timing chart shown in FIG. 2A.

FIG. 2A depicts a timing chart of the communication processes performed in a facsimile communication system of the prior art. FIG. 2B schematically depicts wave-forms created by a transmitter operating in accordance with the timing chart shown in FIG. 2A. Referring to FIG. 2A, the transmitter sends a call signal to the remote receiver (see call signal 21 in FIG. 2B). The remote receiver sends back a response signal to the transmitter. Then, a starting signal START (see starting signal 22 in FIG. 2B) is sent to the remote receiver. When the remote receiver receives the starting signal, the remote receiver energizes the MODEM 14 (FIG. 1). As a result, the MODEM training process is started between the transmitter and the remote receiver (see MODEM training signal 23 in FIG. 2B). During the MODEM training process, a pseudo random pattern is sequentially transmitted from the transmitter to the remote receiver. The remote receiver utilizes the pseudo random pattern for detecting the error rate level which varies in accordance with the electric condition of the transmission line, and thus equalizes the MODEM. If the remote receiver detects that the error rate level exceeds the reference error rate level due to a bad electric condition of the transmission line, then the remote receiver sends the so-called fall-back signal to the transmitter. When the transmitter receives the fall-back signal, it reduces the data transfer speed from 9600 bit/sec to 4800 bit/sec, 2400 bit/sec or 1200 bit/sec in order to decrease the error rate level. If the data transfer speed is reduced to, for example, 4800 bit/sec, due to the above first step of the MODEM training process, a predetermined training bit pattern is sequentially transmitted from the transmitter to the remote receiver at a data transfer rate of 4800 bit/sec. In the remote receiver, an automatic equalizer (not shown) contained in the MODEM 14 (FIG. 1) is adjusted by using the training bit pattern at the data transfer speed of 4800 baud. The above embodiment of the MODEM training process has recently been recommended by the International Telegraph and Telephone Consultative Committee for implementation in a facsimile communication system.

In the next step, the transmitter sends a first control signal (see control signal 24-1 in FIG. 2B) to the remote receiver. The control signal confirms whether or not the machine parts of the remote receiver are ready for reproducing and printing the facsimile information from the transmitter. Also, the control signal commands the remote receiver to reproduce the facsimile information at a particular scanning line density, for example, 4 lines/mm or 8 lines/mm, according to the picture element density of the document. When the machine parts exhibit a ready status, the remote receiver sends a response signal to the transmitter. When the transmitter receives the response signal, facsimile information from the first page of the documents (see facsimile information 25-1 in FIG. 2B) is sent to the remote receiver. When sending of the facsimile information from the first page of the documents is finished, the transmitter then sends a first end-of-page signal (EOP) to the remote receiver (see end-of-page signal 26-1 in FIG. 2B). Then, the remote receiver sends back a response signal to the transmitter. When the transmitter receives the response signal, a second control signal (see control signal 24-2 in FIG. 2B) is supplied therefrom. Accordingly, the facsimile information from a second page of documents (see facsimile information 25-2 in FIG. 2B) is sent to the remote receiver. Similarly, each unit of facsimile information corresponding to a respective scanning line is sequentially sent to the remote receiver. Finally, when sending of the facsimile information of an "Nth" page of documents (see facsimile information 25-N in FIG. 2B) to the remote receiver is finished, and an Nth end-of-page signal EOP (see end-of-page signal 26-N in FIG. 2B) is received thereby, then one transmission operation for transferring one batch of documents is completed.

Referring to FIG. 2B, if the previously-mentioned route switch of the transmission lines occurs at a time, for example "$t_0$", and, further, if the route I (FIG. 1) of the transmission line having a good electric condition is switched to another route II (FIG. 1) of the transmission line having a bad electric condition at the time "$t_0$", the successive pages of the facsimile information of the documents may not be transmitted correctly from the transmitter to the remote receiver. Accordingly, the quality of the facsimile of the original documents which are sent to the remote receiver after the time "$t_0$" will be reduced because the digital video signal signals containing the facsimile information from these original documents may exhibit a high error rate (see hatched wave-forms 25-2, 25-3 . . . 25-N in FIG. 2B).

Figure 3A:
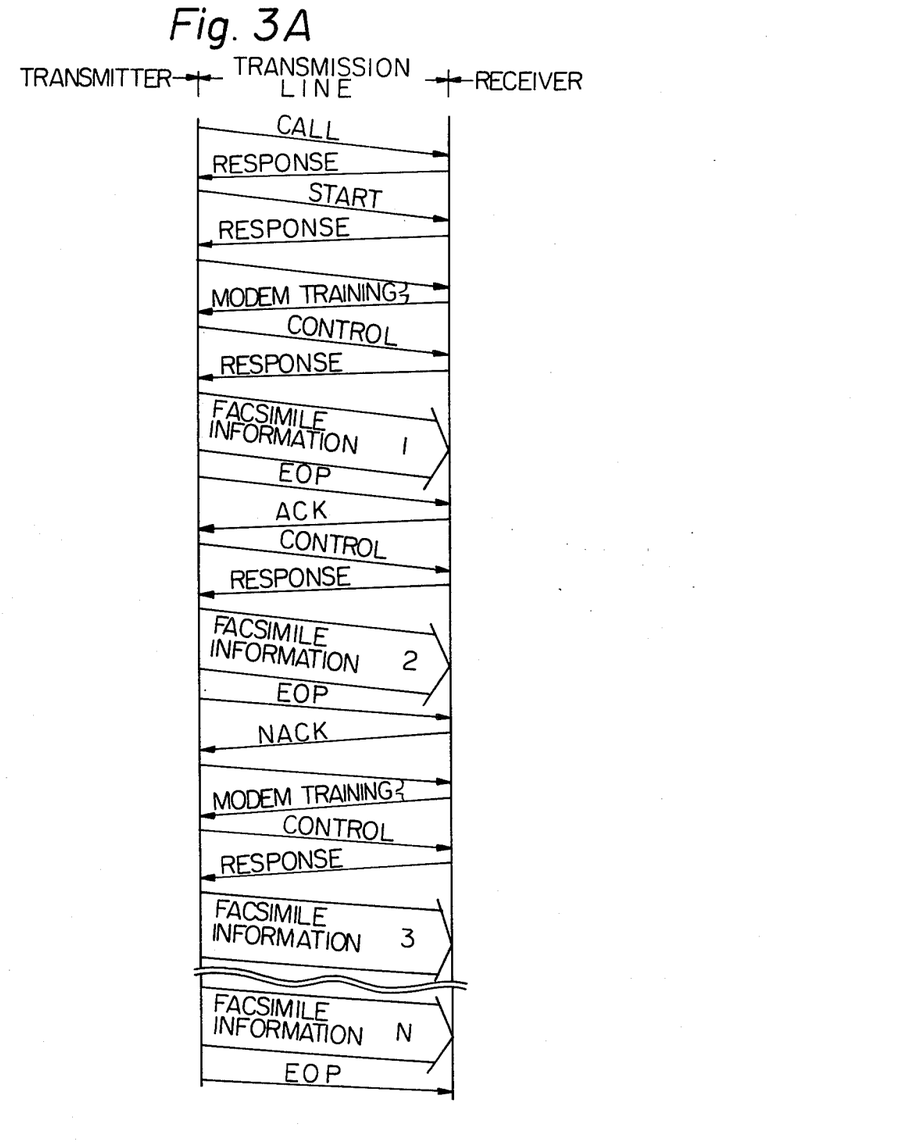
FIG. 3A is a timing chart of the communication processes performed in a facsimile communication system according to the present invention.
Figure 3B:
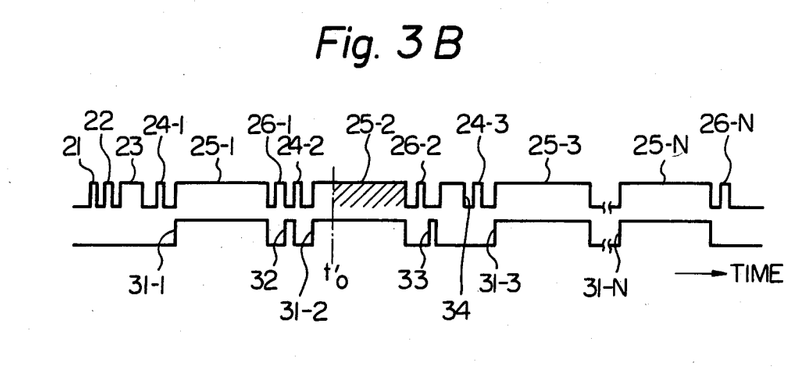
FIG. 3B schematically depicts wave-forms created by a transmitter in operating in accordance with the timing chart shown in FIG. 3A.

FIG. 3A depicts a timing chart of the communication processes performed in a facsimile communication system according to the present invention. FIG. 3B schematically depicts wave-forms created by the transmitter in accordance with the timing chart shown in FIG. 3A. Most of the communication processes shown in FIG. 3A are the same as the processes depicted in FIG. 2A. In FIG. 3B, the wave-forms designated by the same reference numerals as those in FIG. 2B are exactly the same as the wave-forms shown in FIG. 2B. In FIG. 3B, the wave-forms 31-1, 32, 31-2, 33, 34, 31-N are newly created in accordance with the present invention. The wave-forms 31-1, 31-2 . . . 31-N indicating error checking processes are simultaneously produced with the execution of the corresponding facsimile information feeding processes 25-1, 25-2, 25-3 . . . 25-N, respectively. In each of the error checking processes, the error rate level with respect to the digital video signal of the facsimile information is supervised in the remote receiver. If the error rate level with respect to, for example, the digital video signal of the facsimile information 25-1 is below the reference error rate level, the facsimile information is determined to be correct. Then, the remote receiver sends back an ACKNOWLEDGE signal (see "ACK" in FIG. 3A and the wave-form 32 in FIG. 3B). Similarly, the error checking process (see wave-form 31-2 in FIG. 3B) is carried out simultaneously with the feeding of the facsimile information (see facsimile information 25-1 in FIG. 3B). If the previously-mentioned route switch of the transmission lines occurs at a time for example "$t_0'$", and further, if the route of the transmission line having a good electric condition is switched to another route of the transmission line having a bad electric condition at the time "$t_0'$", then the error rate level of the facsimile information 25-2 soon exceeds the reference error rate level. Such a condition can be detected by the remote receiver in the error checking process 31-2 after the time "$t_0'$". In this case, the remote receiver sends back a NON-ACKNOWLEDGE signal (see "NACK" in FIG. 3A and also NON-ACKNOWLEDGE signal 33 in FIG. 3B). The NON-ACKNOWLEDGE signal 33 includes the aforementioned fall-back signal. When the transmitter receives the fall-back signal, it reduces the data transfer speed from 9600 bit/sec to 4800 bit/sec, 2400 bit/sec, or 1200 bit/sec in order to decrease the error rate of the digital video signals regarding the facsimile information 25-3 to 25-N and to obtain correct facsimile information 25-3 to 25-N. After the NON-ACKNOWLEDGE signal 33 is received by the transmitter, the MODEM training process (see FIG. 3A and also wave-form 34 in FIG. 3B) is again carried out by both the transmitter and the remote receiver. This MODEM training process is carried out at the reduced data transfer speed of, for example, 4800 bit/sec. Thus, although the route switch occurs at a time "$t_0'$", correct facsimile information 25-3 . . . 25-N are still obtained by the remote receiver. This is contrary to the prior art systems and methods, wherein incorrect facsimile information 25-3 . . . 25-N are sent after the time "$t_0'$" to the remote receiver.

As mentioned above, the facsimile communication system of the present invention can transmit facsimile information without reducing the quality of the facsimile of the original documents except for only one page of the documents (see corresponding wave-form 25-2 in FIGS. 2A and 3B). The differences between the facsimile communication systems of the prior art and the present invention are as follows. In the prior art, only one MODEM training process is carried out per facsimile transferring operation, and it occurs immediately before the sending of the facsimile information of one batch of documents from the transmitter to the remote receiver. Accordingly, the data transfer speed cannot be changed during the time when the one facsimile transferring operation is being carried out.

Contrary to the above, in the present invention, the data transfer speed can be changed, if necessary, during the time when the one facsimile transferring operation is being carried out because the error rate of the digital video signal of each unit of facsimile information of one group of documents is continuously supervised by the remote receiver.

Figure 4:
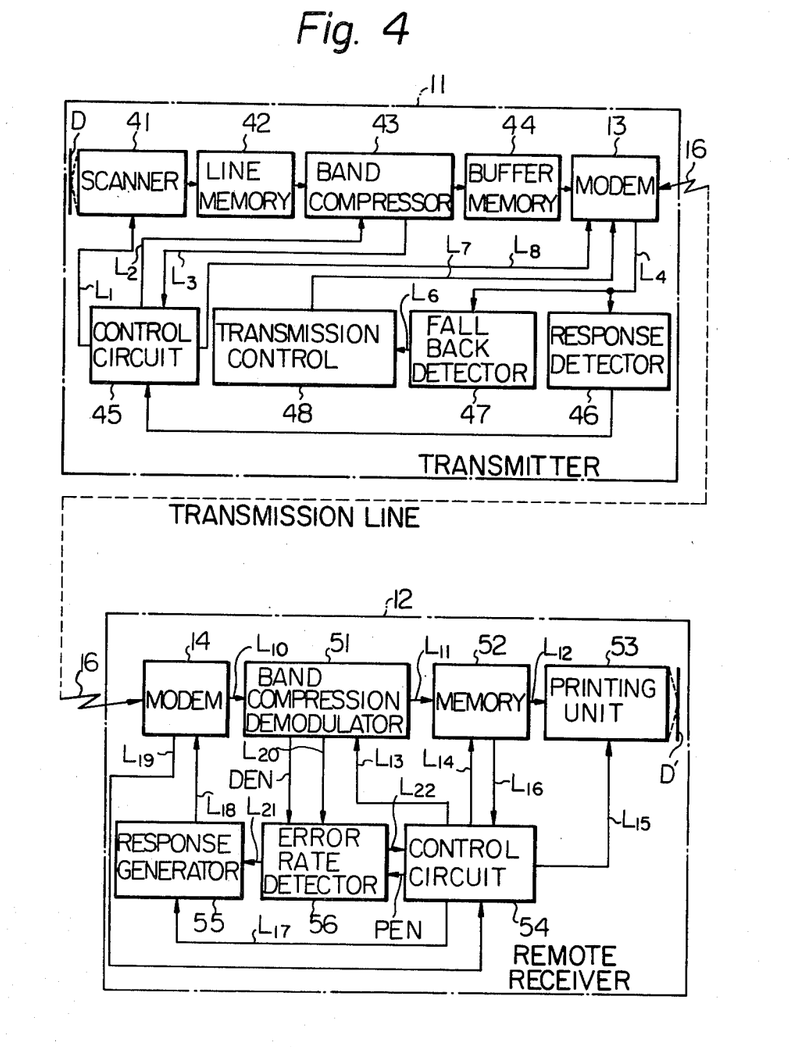
FIG. 4 is a schematic diagram showing a facsimile communication system according to the present invention.

FIG. 4 is a schematic diagram showing a facsimile communication system according to the present invention. In FIG. 4, the reference numerals 11, 12 and 16, respectively indicate the transmitter, the remote receiver and the transmission line, as shown in FIG. 1. A scanner 41 scans a document D to be reproduced in the remote receiver 12 by way of the transmission line 16. A line memory 42 momentarily stores the digital video signal from the scanner 41. Such digital video signal, that is, the facsimile information, is obtained every time the scanner 41 scans one scanning line on the document D. The facsimile information stored in the line memory 42 is then compressed by a band compressor 43. The compressed facsimile information is applied to the MODEM 13 by way of a buffer memory 44. The MODEM 13 can supply the compressed facsimile information to the transmission line 16 at one of the desired data transfer speeds selected from 9600 bit/sec, 4800 bit/sec, 2400 bit/sec and 1200 bit/sec. The above members 41 through 44 and 13 are conventional members, and the details of these members are disclosed in, for example, copending U.S. Pat. Application No. 763,516 filed on Jan. 28, 1977. A control circuit 45 controls the scanner 41 and the band compressor 43 by way of lines $L_1$ and $L_2$, respectively. The control signal transferred over the line $L_1$ commands, for example, the time at which the scanner 41 starts to operate. The control signal transferred over the line $L_2$ controls the starting and stopping operations of the band compressor 43. A response signal is transferred over a line $L_3$ from the band compressor 43 to the control circuit 45. A response detector 46 receives control information transmitted from the remote receiver 12 by way of the transmission line 16, the MODEM 13, and a line $L_4$. The response detector 46 extracts the response signal from the control information. The response signal is then applied to a line $L_5$. The response signal contains information pertaining to, for example, the completion of the MODEM training process in the remote receiver, the completion of the reproduction of the facsimile information, and so on. The reference numeral 47 indicates a novel feature of the present invention, that is, the fall-back signal detector which extracts the fall-back signal (corresponding to the NON-ACKNOWLEDGE signal 33 in FIG. 3B) from the control information (also received via line $L_4$). When the detector 47 detects the fall-back signal, the fall-back signal is then applied to a transmission control circuit 48 by way of a line $L_6$. The transmission control circuit 48 commands the MODEM 13 (via line $L_7$) to reduce the data transfer speed, for example, from 9600 bit/sec to 4800 bit/sec. Thereafter, the facsimile information stored in the buffer memory 44 is transferred at 4800 bit/sec by means of the MODEM 13.

In the remote receiver 12, the modulated and compressed facsimile information supplied from the transmission line 16 is demodulated by the MODEM 14. Furthermore, the compressed facsimile information is demodulated by a band compression demodulator 15 connected by way of a line $L_{10}$, and the facsimile information from the original documents is reproduced therein. The facsimile information is supplied to a memory 52 by way of a line $L_{11}$ and temporarily stored therein. The stored facsimile information in the memory 52 is fed to a printing unit 53 via a line $L_{12}$. The printing unit 53 prints the reproduced document D' on a sheet of paper. The above members 51 and 52 are conventional members, and details of these members are also disclosed in the specification of the aforesaid patent application. A control circuit 54 controls the band compression demodulator 51, the memory 52 and the printing unit 53 by means of lines $L_{13}$, $L_{14}$ and $L_{15}$, respectively. The control signal transferred over the line $L_{13}$ commands the band compression demodulator 51 to start its demodulation operation when there is no error in the facsimile information, and also commands the demodulator 51 to provide the facsimile information to the memory 52. The control signal transferred over the line $L_{14}$ indicates the address in the memory 52 at which each unit of the facsimile information is stored. The control signal transferred over the line $L_{15}$ controls the time for printing of the document D' by the printing unit 53. A response signal to the control signal transferred over the line $L_{14}$ is sent back to the control circuit 54 by way of a line $L_{16}$. The control circuit 54 also provides a response signal to a response generator 55 by way of a line $L_{17}$, which response signal contains information pertaining to, for example, the completion of the MODEM training process in the remote receiver, the completion of the reproduction of the facsimile information, and so on. This response signal is transmitted from the remote receiver to the response detector 46 in the transmitter 11 via the response generator 55, a line $L_{18}$, the MODEM 14, and the transmission line 16. On the other hand, the control circuit 54 receives control information by way of a line $L_{19}$, which control information includes the command from the transmitter 11 to be applied to the control circuit 54. The reference numeral 56 indicates a novel feature of the present invention, that is, the error rate detector which supervises the error rate of the facsimile information via a line $L_{20}$. The facsimile information is reproduced in the band compression demodulator 51. If the error rate detector 56 detects that the level of the error rate regarding certain facsimile information exceeds the reference error rate level, the error rate detector 56 sends a fall-back signal to the response generator 55 by way of a line $L_{21}$. The fall-back signal applied to the transmitter 11 and the response signal are combined in the response generator 55. Thereafter, the combined signals are fed to the transmitter 11 as control information from the remote receiver 12 to the transmitter 11. The response signal and the fall-back signal are processed by the response detector 46 and the fall-back signal detector 47, respectively.

Figure 5:
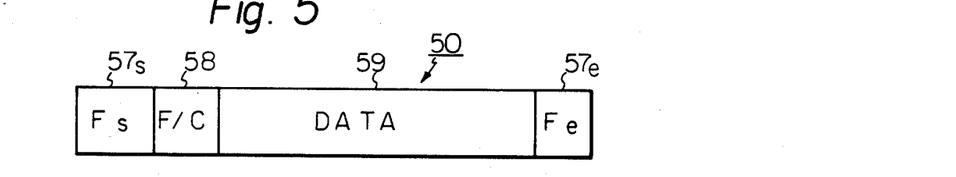
FIG. 5 illustrates the data format of a transmission signal transmitted over a transmission line from a transmitter to a remote receiver in accordance with the present invention.

FIG. 5 illustrates the data format of a transmission signal transmitted over the transmission line 16 (FIG. 4) from the transmitter 11 (FIG. 4) to the remote receiver 12 (FIG. 4) by means of the control circuit 45 (FIG. 4) by and via line $L_8$ (FIG. 4). In FIG. 5, the data format 50 is comprised of a start flag byte (Fs) 57s, a discrimination byte 58, data bytes 59, and an end flag byte (Fe) 57e. The start flag byte (Fs) 57s, is used as a synchronizing signal in the remote receiver. The end flag byte (Fe) 57e indicates the end of the transmission signal to the remote receiver. The discrimination byte 58 indicates what kind of information is being transferred in the data bytes 59. If the data bytes 59 contain facsimile information, the discrimination byte 58 indicates a flag "F". If the data bytes 59 contain control information, the discrimination byte 58 indicates a flag "C". When the discrimination byte 58 indicates the flag "F" (bit "1"), the data bytes 59 comprised of 2048 bits transfer a set of facsimile information corresponding to one scanning line on the document D (FIG. 4), which scanning line is scanned by the scanner 41 (FIG. 4). When a large number of data formats 50 obtained by scanning an entire page of document are sequentially transferred to the remote receiver, each of the information feeding processes 25-1, 25-2 . . . 25-N (see FIG. 3B) is created. When the discrimination byte 58 indicates the flag "C" (bit "0"), the data bytes 59 transfer to the remote receiver the call signal 21, starting signal 22, MODEM training signals 23, 34, control signals 24-1, 24-2 . . . 24-N, and end of page signals 26-1, 26-2 . . . 26-N (see FIG. 3B). This control information is mainly supplied to the control circuit 54 in the remote receiver 12 (see FIG. 4).

Figure 6:
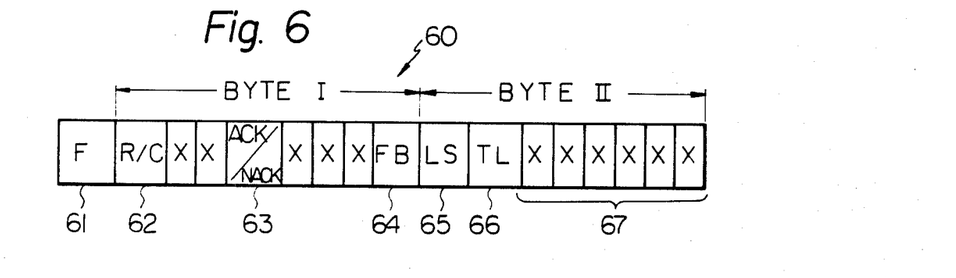
FIG. 6 illustrates the data format of a transmission signal transmitted over the transmission line from the remote receiver to the transmitter in accordance with the present invention.

FIG. 6 illustrates the data format of a transmission signal transmitted over the transmission line 16 (FIG. 4) from the remote receiver 12 (FIG. 4) to the transmitter 11 (FIG. 4) by means of the response generator 55 (FIG. 4). The data format 60 is comprised of a flag byte 61, a first byte I and a second byte II. The flag byte 61 is used as a synchronizing signal in the transmitter. A first discrimination bit 62 indicates whether the corresponding data format 60 contains a response signal R (bit "1") to be sent to the transmitter or a command signal C (bit "0") to be sent to the transmitter. A second discrimination bit 63 indicates a response signal to be sent to the transmitter. This response signal is classified into two signals, that is, the ACKNOWLEDGE signal (ACK) and the NON-ACKNOWLEDGE signal (NACK). The ACKNOWLEDGE signal (bit "1") is the same as the ACKNOWLEDGE signal 32 in FIG. 3B, and the NON-ACKNOWLEDGE signal (bit "0") is the same as the NON-ACKNOWLEDGE signal 33 in FIG. 3B. When the error rate LEVEL is detected to be lower than the reference error rate level by means of the error rate detector 56 (FIG. 4), and if the facsimile information transmitted to the remote receiver is correct, the error rate detector 56 will send an ACKNOWLEDGE signal to the response generator 55 (FIG. 4). Contrary to this, when the error rate level is detected to be higher than the reference error rate level, and if the facsimile information transmitted to the remote receiver is not correct, the error rate detector 56 will send the NON-ACKNOWLEDGE signal to the response generator 55 (FIG. 4). This NON-ACKNOWLEDGE signal can be the so-called fall-back signal or the line switch instruction signal. The fall-back signal instructs the transmitter to reduce the data transfer speed in the MODEM 13 (FIG. 4). When the error rate level is much higher than the reference error rate level, the line switch instruction signal instructs the transmitter to select another line having a good electric condition. When the fall-back signal is sent back to the transmitter, a bit (FB) 64 becomes a logic "1". When the line switch instruction signal is sent back to the transmitter, a bit (LS) 65 becomes a logic "1". Other bits 66 and 67 may be used for transmitting auxiliary information to the transmitter, for example, the bit (TL) 66 can be used for informing the transmitter that the remote receiver 48 requires a change in the operation from the facsimile information transmitting mode to the telephone conversation mode.

Figure 7A:
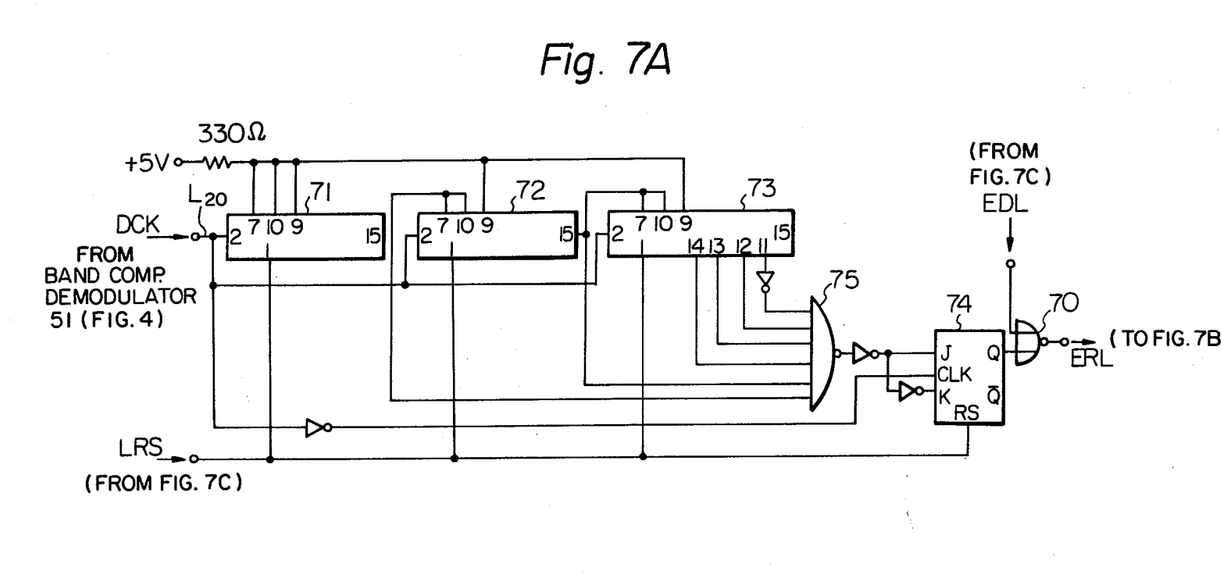
FIGS. 7A, 7B and 7C illustrate a detailed circuit diagram of an error rate detector 56 shown in FIG. 4.
Figure 7B:
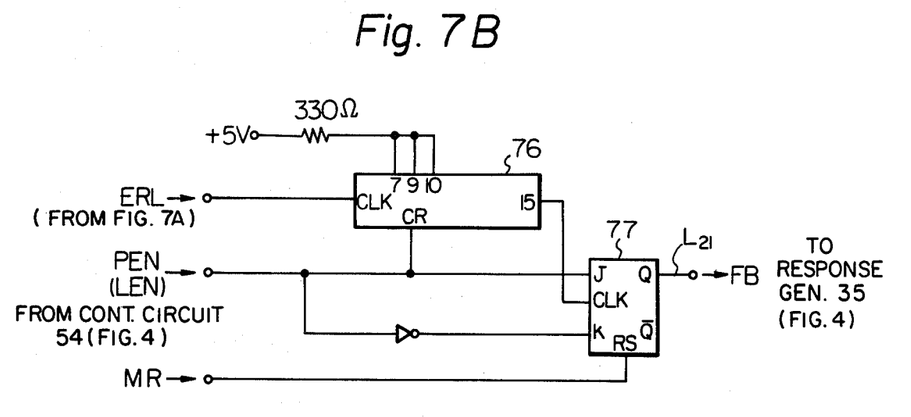
Figure 7C:
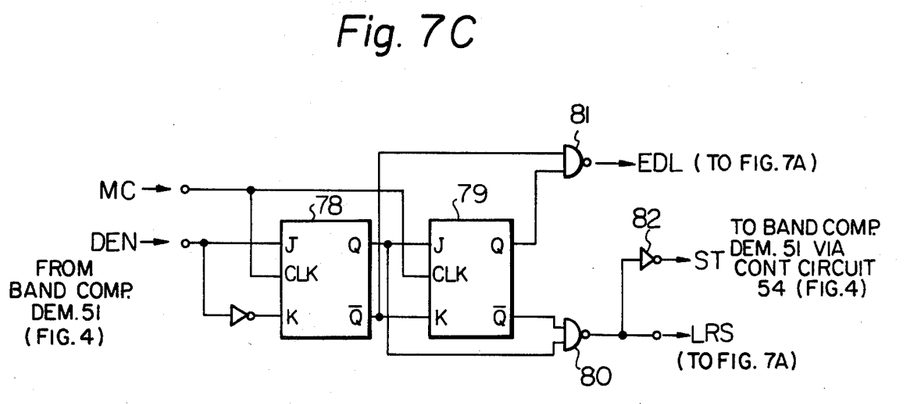

FIGS. 7A, 7B and 7C respectively illustrate a detailed block diagram of the error rate detector 56 shown in FIG. 4. The error rate detector 56 shown by the circuit diagram of FIG. 7A detects whether or not each unit of the facsimile information produced by respective scanning lines includes errors. Such facsimile information is contained in the data bytes 59 (FIG. 5). The circuit shown in FIG. 7B is provided for counting the number of error-containing facsimile information units produced by respective scanning lines. Furthermore, this circuit produces a fall-back signal when the counted number exceeds the reference number. The circuit shown in FIG. 7C provides a reset pulse applied to counters 71, 72, 73 and to a J-K flip-flop 74 shown in FIG. 7A. In FIG. 7A a first stage counter 71 comprised of a conventional hexadecimal counter receives data clock pulses "DCK" of the demodulated facsimile information from the band compression demodulator 51 (FIG. 4) by way of a line $L_{20}$ (FIG. 4). When the facsimile information of one scanning line contains no errors, the number of the data clock pulses (DCK) will be exactly 2048. However, when the facsimile information of one scanning line includes errors, the number of the data clock pulses of the demodulated facsimile information will be lower or higher than 2048. A second stage counter 72 and a third stage counter 73 are both comprised of conventional hexadecimal counters. Accordingly, the first, second and third stage counters 71, 72 and 73 can count up to 2048 or even more. The J-K flip-flop 74 receives at its J-input terminal selected output bit pulses from the outputs of the counters 71, 72 and 73 via the logic gate circuit 75. When the counters 71, 72 and 73 finish counting 2047 data clock pulses of the facsimile information corresponding to respective scanning lines, a logic "1" is applied to the J-input terminal of the J-K flip-flop 74. Therefore, when the 2048th data clock pulse is applied to the CLK terminal (clock terminal) of the J-K flip-flop 74, the Q-output terminal thereof becomes a logic "1". The logic status of this Q-output is sampled by a NOR gate 70 whenever a data enable signal (DEN) disappears. An EDL (End of line) signal is applied to the NOR gate 70 when the data enable signal (DEN) disappears. The data enable signal (DEN) is supplied from the band compression demodulator 51 by way of a DEN line (FIG. 4) and maintains a logic "1" state only during that time when the facsimile information is being supplied from the data bytes 59 (FIG. 5). If the logic status of the Q-output terminal becomes a logic "1" when the EDL signal is being changed to a logic "1", the NOR gate 70 produces an ERL (Error of line) signal which is now a logic "0". The logic "0" of the ERL signal indicates that the facsimile information of one scanning line includes no errors. If the facsimile information includes errors, for example, if 2049 or more data clock pulses are included in the facsimile information, the 2048th data clock pulse is supplied to the CLK terminal of the J-K flip-flop 74 before the data enable signal (DEN) disappears. Accordingly, the Q-output terminal of the flip-flop 74 provides a logic "1" output before the data enable signal disappears, and the logic status of the Q-output terminal changes from a logic "1" to a logic "0" when the 2049th data clock pulse is applied to the CLK terminal of the flip-flop 74. Accordingly, when the EDL signal (logic "1") is applied to the NOR gate 70, the logic status of the Q-input terminal will have already been changed to a logic "0". Thereafter, the NOR gate 70 produces the ERL signal which now has a logic "1" status. The logic "1" status of the ERL signal indicates that the facsimile information of one scanning line includes errors. If the facsimile information includes errors, for example, if 2047 or fewer data clock pulses are included in the facsimile information, the 2048th data clock pulse is supplied to the CLK terminal of the flip-flop 74 after the data enable signal disappears. Accordingly, the Q-output terminal of the flip-flop 74 provides a logic "1" output after the data enable signal (DEN) disappears. Therefore, when the EDL signal (logic "1") is applied to the NOR gate 70, the logic status of the Q terminal will still remain a logic "0". Thereafter, the NOR gate 70 produces the ERL signal which now has a logic "1" status. The logic "1" of the ERL signal indicates that the facsimile information of one scanning line includes errors.

As mentioned above, when the facsimile information includes errors, the ERL signal having a logic "1" value is produced from the NOR gate 70. This ERL signal is, on the one hand, applied to a counter 76 shown in FIG. 7B and, on the other hand, applied to the control circuit 54 in FIG. 4. In FIG. 7B, the counter 76 counts the number of ERL signals. If the reference error rate level is predetermined to be 16, an FB signal is provided from a Q-output terminal of a J-K flip-flop 77 to the response generator 55 by way of a line $L_{21}$ (see FIG. 4) when the number of facsimile information units including errors exceeds 16 per every page of documents to be sent to the remote receiver. In this case the counter 76 may be comprised of a conventional hexadecimal counter. The 15th output bit of the counter 76 is applied to a CLK terminal (clock terminal) of the flip-flop 77. A J-input terminal of the flip-flop 77 receives a page enable signal PEN which is a logic "1" during transmission of the facsimile information from one page of the documents to the remote receiver. The PEN signal is provided from the control circuit 54 (FIG. 4) by way of a PEN line (see FIG. 4). The PEN signal is also used to reset the counter 76 to its initial state. An MR signal resets the flip-flop 77 to its initial state, which MR signal becomes a logic "1" at the beginning of the PEN signal of the next successive unit of facsimile information from the following page of the documents or at the beginning of a LEN signal (explained hereinafter). In FIG. 7A, the counters 71, 72, 73 and the J-K flip-flop 74 are simultaneously reset to their initial states by an LRS (Line Reset) pulse. The LRS pulse is produced at the beginning of the next successive DEN signal. FIG. 7C illustrates a circuit for creating the LRS pulse. In FIG. 7C, the reference numerals 78 and 79 respectively designate J-K flip-flops. The main clock pulse MC is applied to both of the CLK (clock) terminals of the flip-flops 78 and 79. A J-input terminal of the flip-flop 78 receives the DEN signal. A NAND gate 80 receives the output signals from the Q-output terminal of the flip-flop 78 and from the $\bar{Q}$-output terminal of the flip-flop 79, and produces the LRS pulse. A NAND gate 81 produces the EDL signal which is applied to the NOR gate 70 shown in FIG. 7A. A start signal ST (FIG. 7C) is supplied to the band compression demodulator 51 (FIG. 4) by way of the control circuit 54 (FIG. 4) and the line $L_{13}$ (FIG. 4). This signal ST starts the operation of the band compression demodulation in the band compression demodulator 51 (FIG. 4).

Figure 8:
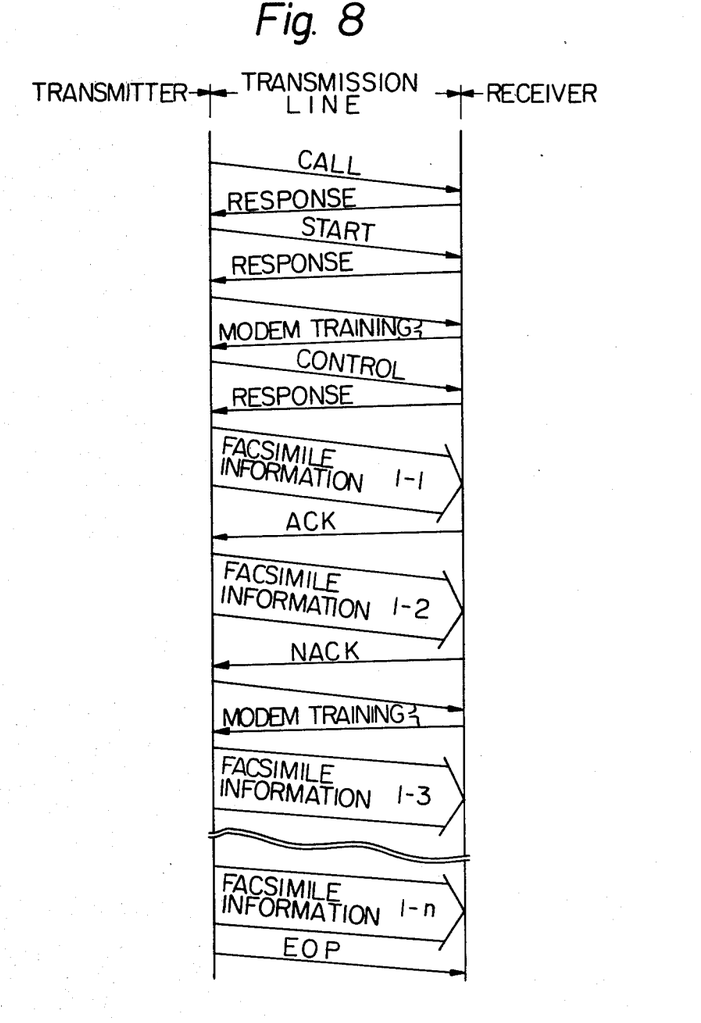
FIG. 8 depicts a timing chart of a modified communication process in a facsimile communication system operating according to the present invention.

FIG. 3A depicts the timing chart in which the fall-back signal can be supplied in correspondence to every page of the documents, if necessary. It should be noted that the fall-back signal can be supplied in correspondence to each of a predetermined number of scanning lines, if necessary. FIG. 8 depicts a timing chart of each modified communication processes in a facsimile communication system, according to the present invention. Most of the processes shown in FIG. 8 are the same as the processes shown in FIG. 3A. However, in FIG. 8, the error checking process is carried out with regard to each of the predetermined scanning lines. If the error rate level is lower than the reference error rate level, the remote receiver sends back an ACKNOWLEDGE signal (see "ACK" in FIG. 8). Contrary to this, if the error rate level exceeds the reference error rate level, the remote receiver sends back a NON-ACKNOWLEDGE signal (see "NACK" in FIG. 8). The NON-ACKNOWLEDGE signal NACK includes the previously-mentioned fall-back signal. The fall-back signal commands the fall-back signal detector 47 (FIG. 7) to reduce the data transfer speed of the MODEM 13 (FIG. 4). Then, the MODEM training process is carried out before the beginning of the process for transmitting the facsimile information of the successive predetermined scanning lines to the remote receiver (see MODEM training in FIG. 8). In this case, a line enable signal LEN is applied to both the counter 76 and the flip-flop 77 instead of the PEN signal (see FIG. 7B). This line enable signal LEN is a logic "1" during that time when each one of a predetermined number of lines is being transmitted to the remote receiver.

Finally, if it is required to process the reproduced facsimile information contaning errors, the control circuit 54 (FIG. 4) can be used to perform this correction. In FIG. 4, when the control circuit 54 receives the ERL (Error of line) signal from the error rate detector 56 by way of a line $L_{22}$ (FIG. 4), the control circuit 54 instructs the memory 52 not to store the facsimile information containing errors. The circuit 54 further instructs the memory 52 to again provide the stored facsimile information to the printing unit 53. This facsimile information is stored in the memory 52 immediately before the facsimile information containing error is demodulated by the band compression demodulator 51. The control circuit 54 can also instruct the control circuit 45 to again scan the scanning line correspond to the facsimile information containing errors, by way of the line $L_{17}$, the response generator 55, the line $L_{18}$, the MODEM 14, the transmission line 16, the MODEM 13, the line $L_4$, the response detector 46 and the line $L_5$. This instruction from the control circuit 54 to the control circuit 45 is transferred by means of the data format 60 shown in FIG. 6. In FIG. 6, the discrimination bit 62 indicates a command signal C (bit "0"), and the instruction information is contained in the bits 67.

As mentioned above, the facsimile communication system according to the present invention can be used to reproduce high-quality facsimile information even if the electric condition of the transmission line suddenly changes to a bad electric condition in the middle of transmitting a plurality of pages of documents from the transmitter to the remote receiver.

While preferred forms and arrangements have been shown in illustrating the invention, it is to be clearly understood that various changes in detail and arrangement may be made without departing from the spirit and scope of the disclosure.

What is claimed is:

1. A facsimile communication system comprising a transmitter and a remote receiver;
    said transmitter including
        a scanner which scans each line of documents to be transmitted and supplies facsimile information corresponding thereto,
        a buffer memory which temporarily stores said facsimile information supplied from the scanner,
        transmitting means for modulating the facsimile information from the buffer memory and for transmitting the modulated facsimile information to said receiver at a specified one of a plurality of transfer speeds, and
        a response signal detector which detects a response signal transmitted from the receiver;
    said remote receiver including
        receiving means for receiving the facsimile information transmitted from the transmitter,
        a printing unit which reproduces the documents according to the facsimile information received,
        an error rate detector, and
        a response generator which produces the response signal transmitted to the response signal detector in the transmitter,
        said error rate detector including means for detecting an error rate for the received facsimile information, and means for producing an instruction signal to be provided to said response generator for transmission to said transmitter as said response signal, said response signal detector being responsive to said instruction signal for instructing the transmitting means to select said specified one of said plurality of data transfer speeds in accordance with said error rate.

2. A facsimile communication system as set forth in claim 1, wherein the instruction signal for instructing the transmitting means to select said specified one of the plurality of data transfer speeds is transmitted between a time when the remote receiver finishes receiving the facsimile information obtained by scanning one page of the documents and a time when the remote receiver starts receiving the facsimile information obtained by scanning a successive page of the documents.

3. A facsimile communication system as set forth in claim 1, wherein the instruction signal for instructing the transmitting means to select said specified one of the plurality of data transfer speeds is transmitted between a time when the remote receiver finishes receiving the facsimile information obtained by scanning a predetermined number of scanning lines on one page of the documents and a time when the remote receiver starts receiving the facsimile information obtained by scanning the predetermined number of successive scanning lines.

4. A facsimile communication system as set forth in claim 1, said transmitting means including means for developing a formatted transmission signal for transmission from the transmitter to the remote receiver, said formatted transmission signal comprising at least a flag byte used as a synchronizing signal in the remote receiver and data bytes used for transferring the modulated facsimile information regarding each scanning line scanned by the scanner; said response generator including means for developing a formatted response signal for transmission from the remote receiver to the transmitter, said formatted response signal comprising at least a flag byte used as a synchronizing signal in the transmitter, a discrimination bit for indicating an ACKNOWLEDGE signal or a NON-ACKNOWLEDGE signal, and an instruction bit for instructing the transmitting means to select said specified one of the plurality of data transfer speeds; which ACKNOWLEDGE signal attains a first logic status when the error rate detector detects that the error rate level of the facsimile information in the data bytes is lower than a predetermined reference error rate level; which NON-ACKNOWLEDGE signal attains a second logic status when the error rate level is higher than the predetermined reference error rate level; and the instruction bit attains a certain logic value when the NON-ACKNOWLEDGE signal attains said second logic status.

5. A facsimile communication system as set forth in claim 1, said means for detecting said error rate having an output for selectively indicating the presence and absence of error in each line of said documents scanned, said means for producing said instruction signal comprising a counter responsive to said output of said means for detecting said error rate for counting the number of scanned lines containing errors, and having a predetermined output bit for indicating the occurrence of a corresponding predetermined number of scanned lines having errors, said means for producing said instruction signal further comprising a flip-flop having a clock terminal connected to said predetermined output bit of said counter for indicating when said predetermined number of scanned lines having errors has occurred, whereby to generate said instruction signal.

6. A facsimile communication system as set forth in claim 1, said means for detecting said error rate comprising a parallel counter arrangement for counting data clock pulses of said demodulated facsimile information and having a plurality of outputs indicating the number of data clock pulses counted, logic means connected to said plurality of outputs of said parallel counter arrangement and responsive to the counting of a predetermined number of data clock pulses for producing a set signal, and a flip-flop circuit responsive to said set signal of said logic means and having a clock terminal responsive to the application of said data clock pulses thereto for indicating selectively the presence and absence of errors in each said scanned line of said documents.

7. A facsimile communication system as set forth in claim 6, further comprising master clock means for providing a master clock signal, said receiving means issuing a data enable signal having a first logic state during transmission of facsimile information to the remote receiver, said system further comprising reset means responsive to said master clock signal and to said data enable signal for resetting said parallel counter arrangement and said flip-flop circuit.

8. A facsimile communication method for communicating facsimile information between a transmitter and a remote receiver through a transmission line at a desired one of a plurality of specified data transfer speeds, said method comprising the steps of:
scanning a document to produce the facsimile information in the transmitter;
modulating the facsimile information;
transmitting the modulated facsimile information to the remote receiver at said desired one of the specified data transfer speeds of the transmitter;
demodulating the transmitted facsimile information;
reproducing the documents according to the facsimile information in the remote receiver;
detecting the error rate of the demodulated facsimile information and comparing same to a predetermined reference rate;
producing an instruction signal instructing the selection of said desired one of the plurality of specified data transfer speeds when the detected error rate exceeds the predetermined reference rate;
transmitting said instruction signal back to the transmitter; and
processing the instruction signal at said transmitter to determine said desired one of said plurality of specified data transfer speeds.

9. A facsimile transmitter for producing facsimile information and transmitting said produced facsimile information to a remote receiver at a desired one of a plurality of specified data transfer speeds based on a facsimile transmission error rate comprising:
a scanner for scanning documents to be transmitted to develop facsimile information;
a buffer memory for temporarily storing said facsimile information developed by the scanner; and
transmitting means for modulating the facsimile information from the buffer memory and for transmitting the modulated facsimile information to the remote receiver at said desired one of the plurality of specified data transfer speeds;
said remote receiver including means for developing an instruction signal indicating said desired one of the plurality of specified data transfer speeds to be utilized based on the facsimile transmission error rate, and for transmitting said instruction signal back to the transmitter;
said transmitter further including transmission control means responsive to said instruction signal from said remote receiver for instructing the transmitting means to select said desired one of the specified data transfer speeds.

10. A facsimile transmitter as set forth in claim 9, wherein the instruction signal indicating said desired one of the plurality of specified data transfer speeds is transmitted between a time when the remote receiver finishes receiving the facsimile information obtained by scanning one page of the documents and a time when the remote receiver starts receiving the facsimile information obtained by scanning a successive page of the documents.

11. A facsimile transmitter as set forth in claim 9, wherein the instruction signal indicating said desired one of the specified plurality of data transfer speeds is transmitted between a time when the remote receiver finishes receiving the facsimile information obtained by scanning a predetermined number of scanning lines on one page of the documents and a time when the remote receiver starts receiving the facsimile information obtained by scanning the predetermined number of successive scanning lines.

12. A facsimile transmitter as set forth in claim 9, said remote receiver further including means for developing a formatted response signal for transmission back to the transmitter, said formatted response signal comprising at least a flag byte used as a synchronizing signal in the transmitter, a discrimination bit for indicating an ACKNOWLEDGE signal or a NON-ACKNOWLEDGE signal, and an instruction bit for instructing the transmitting means to select said desired one of the plurality of specified data transfer speeds.

13. A facsimile transmitter as set forth in claim 9, wherein said scanner scans successive lines of said documents, said means for developing said instruction signal comprising an error rate detector for detecting the number of errors contained in each successive line scanned by said scanner, means responsive to said error rate detector for determining whether said number of scanned lines containing errors exceeds a predetermined level, and a response generator for issuing said instruction signal when said number of successive lines containing errors exceeds said predetermined number.

14. A facsimile transmitter as set forth in claim 13, said error rate detector comprising counter means for counting the number of successive lines containing errors, and having a predetermined bit output indicating the occurrence of said predetermined number of successive lines containing errors, and a flip-flop circuit having a clock terminal connected to the predetermined bit output of said counter means, and having an output for selectively indicating the occurrence and nonoccurrence of said predetermined number of successive lines containing errors, whereby to generate said instruction signal.

15. A facsimile remote receiver for processing facsimile information transmitted thereto by a transceiver at a desired one of a plurality of data transfer speeds based on the error rate of said facsimile information transmission, said receiver comprising:
  means for receiving the transmitted facsimile information from said transceiver;
  printing unit means for reproducing the documents according to the facsimile information;
  error rate detector means for detecting the error rate of the facsimile information and for producing an instruction signal; and
  means for transmitting said instruction signal to the transceiver, the transceiver being responsive thereto for selecting said desired one of the plurality of data transfer speeds.

16. A facsimile remote receiver as set forth in claim 15, wherein the instruction signal for instructing the transceiver to select said desired one of the plurality of data transfer speeds is transmitted between a time when the remote receiver finishes receiving the facsimile information obtained by scanning one page of the documents and a time when the remote receiver starts receiving the facsimile information obtained by scanning a successive page of the documents.

17. A facsimile remote receiver as set forth in claim 15, wherein the instruction signal for instructing the transceiver to select said desired one of the plurality of data transfer speeds is transmitted between a time when the remote receiver finishes receiving the facsimile information obtained by scanning a predetermined number of scanning lines on one page of the documents and a time when the remote receiver starts receiving the facsimile information obtained by scanning the predetermined number of successive scanning lines.

18. A facsimile remote receiver as set forth in claim 15, wherein said transceiver comprises means for developing a formatted transmission signal for transmission from the transceiver to the remote receiver, said formatted transmission signal comprising at least a flag byte used as a synchronizing signal in the remote receiver and data bytes used for transmitting the facsimile information.

19. A facsimile remote receiver as set forth in claim 15, said transceiver including a scanner for scanning a document to develop said facsimile information, wherein said error rate detector means for detecting the error rate of the facsimile information and for producing said instruction signal comprises an error rate detector for detecting the number of errors contained in each successive line scanned by said scanner, means responsive to said error rate detector for determining whether said number of scanned lines containing errors exceeds a predetermined level, and a response generator for issuing said instruction signal when said number of successive lines containing errors exceeds said predetermined number.

20. A facsimile remote receiver as set forth in claim 19, said error rate detector comprising counter means for counting the number of successive lines containing errors, and having a predetermined bit output indicating the occurrence of said predetermined number of successive lines containing errors, and a flip-flop circuit having a clock terminal connected to the predetermined bit output of said counter means, and having an output for selectively indicating the occurrence and nonoccurrence of said predetermined number of successive lines containing errors, whereby to generate said instruction signal.

* * * * *

UNITED STATES PATENT AND TRADEMARK OFFICE
CERTIFICATE OF CORRECTION

PATENT NO. : 4,153,916
DATED : May 8, 1979
INVENTOR(S) : Miwa et al

It is certified that error appears in the above-identified patent and that said Letters Patent are hereby corrected as shown below:

Col. 3, line 1, "wave-forms" should be -- waveform --;
Col. 3, line 7, "wave-forms" should be -- waveform --;
Col. 3, line 56, "wave-forms" should be -- waveform --;
Col. 5, line 11, "wave-forms" should be -- waveform --;
Col. 5, line 15, "wave-forms" should be -- waveform --;
Col. 5, line 17, "wave-forms" should be -- waveform --;
Col. 5, line 18, "wave-forms" should be -- waveform --;
Col. 5, line 20, "wave-forms" should be -- waveform --;
Col. 5, line 32, "wave-form" should be -- waveform --;
Col. 5, line 33, "wave-form" should be -- waveform --;
Col. 5, line 59, "wave-form" should be -- waveform --;
Col. 6, line 5, "wave-form" should be -- waveform --;
Col. 10, line 50, "facimile" should be -- facsimile --;
Col. 11, line 46, "contaning" should be -- containing --;
Col. 11, line 59, "correspond" should be -- corresponding --.

Signed and Sealed this

Twelfth Day of February 1980

[SEAL]

Attest:

Attesting Officer

SIDNEY A. DIAMOND

Commissioner of Patents and Trademarks